(12) United States Patent
Sundararajan et al.

(10) Patent No.: US 12,731,069 B2
(45) Date of Patent: Sep. 8, 2026

(54) FRACTAL RELATIONSHIPS FOR TRAINING ARTIFICIAL INTELLIGENCE CLASSIFIER

(71) Applicant: INTERNATIONAL BUSINESS MACHINES CORPORATION, Armonk, NY (US)

(72) Inventors: Mukundan Sundararajan, Bangalore (IN); Jignesh K Karia, Thane (IN); Radhika Sharma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 683 days.

(21) Appl. No.: 17/569,183

(22) Filed: Jan. 5, 2022

(65) Prior Publication Data

US 2023/0214709 A1 Jul. 6, 2023

(51) Int. Cl.
*G06N 20/00* (2019.01)

(52) U.S. Cl.
CPC .................................... *G06N 20/00* (2019.01)

(58) Field of Classification Search
CPC ....... G06N 20/00; G06N 3/084; G06N 3/0418
See application file for complete search history.

(56) References Cited

U.S. PATENT DOCUMENTS

| | | | | |
|---|---|---|---|---|
| 2002/0054694 | A1* | 5/2002 | Vachtsevanos ...... | G06V 10/421 382/156 |
| 2017/0038769 | A1 | 2/2017 | Hidaka et al. | |
| 2020/0117580 | A1* | 4/2020 | Lekivetz .............. | G06V 10/776 |
| 2020/0134484 | A1 | 4/2020 | Hazard et al. | |

FOREIGN PATENT DOCUMENTS

| | | | |
|---|---|---|---|
| CN | 113011506 | A | 6/2021 |
| IN | 201941027921 | A | 8/2019 |

OTHER PUBLICATIONS

Moradi, Reza, Reza Berangi, and Behrouz Minaei. "Sparsemaps: convolutional networks with sparse feature maps for tiny image classification." Expert Systems with Applications 119 (2019): 142-154. https://www.sciencedirect.com/science/article/pii/S0957417418306547 (Year: 2019).*

(Continued)

*Primary Examiner* — Michael H Hoang
(74) *Attorney, Agent, or Firm* — CHIP LAW GROUP

(57) ABSTRACT

The classifier of an artificial intelligence model is trained by mapping output values in a final run of a training phase, measuring dense data portion and sparse data portion of a data plot produced by the training phase by identifying outputs near edges of the data plot and extracting the curve patterns as linear functions in the dense areas of the output; obtaining a fractal function base set of patterns from the linear functions provided by the dense areas of the output; applying the fractal function base set of patterns from the dense areas of the output to the sparse data portion of the data plot; and training the artificial intelligence model using the data plot including the dense areas of the output and the sparse data portion of the data plot that has been fit to the data curve using the fractal function base set of patterns.

17 Claims, 7 Drawing Sheets

(56) References Cited

OTHER PUBLICATIONS

Larsson, Gustav, Michael Maire, and Gregory Shakhnarovich. "Fractalnet: Ultra-deep neural networks without residuals." arXiv preprint arXiv:1605.07648 (2016). https://arxiv.org/pdf/1605.07648 (Year: 2016).*

Mell, Peter, et al., "The NIST Definition of Cloud Computing," Sep. 2011, 7 pages.

Yarlagadda, Anuradha, et al., "Clustering based on correlation fractal dimension over an evolving data stream," Int. Arab J. Inf. Technol, Jan. 2018, pp. 1-9, 15,1.

* cited by examiner

FRACTAL RELATIONSHIPS FOR TRAINING ARTIFICIAL INTELLIGENCE CLASSIFIER

BACKGROUND

The present disclosure generally relates to artificial intelligence models, and more particularly to detecting fractal relationships as used for training artificial intelligence models A large number of artificial intelligence classifiers today provide dual or multiple cluster outputs in the determination of the decision/decision categories for the different inputs that are processed. In the training and testing phases of a machine learning (ML) model, the assignment of the output to a cluster is definite, and large training data sets are used to ensure that adequate boundary definition with separation across clusters is obtained for known inputs. However, since the output space—planar or multi-dimensional—will have a very large number of points, determining the size of the input test sets to produce appropriate outputs for each of the points can be difficult. Hence, the outputs of machine leaning (ML) models provide for separated points depicting the cluster boundaries. Some solutions include hyper planes or hyper convex hulls. However, there is no definite way to determine the likely path between two points on the cluster boundary, and hence when an output point appears that has not been in the training/testing data set. In some instances, the question arises if the point is associated with one cluster or another cluster. The identification of points within a cluster can employ in which various techniques, such as the probabilistic condition of being in one or another cluster, computing distances to various output points known, and using the threshold or root mean square (RMS} conditions. These are not efficient ways, as there is a doubt if the clustering decision is right (i.e., correct), or can be a false condition, and hence needs human intervention to determine the condition.

SUMMARY

In accordance with one aspect of the present disclosure, a computer-implemented method for training the classifier of an artificial intelligence model that includes mapping output values in a final run of a training phase; measuring a dense data portion and a sparse data portion of a data plot produced by the training phase; and identifying outputs near edges of the data plot. The method may further include obtaining a fractal function base set of patterns from the edges of the data plot in the dense areas of the output; and applying the fractal function base set of patterns from the dense areas of the output to the sparse data portion of the data plot. The method can further include training the artificial intelligence model using the data plot including the dense areas of the output and the sparse data portion of the data plot that has been fit to the data curve using the fractal function base set of patterns.

In accordance with another embodiment of the present disclosure, a system for training the classifier of an artificial intelligence model is described that includes a hardware processor; and a memory that stores a computer program product. The computer program product when executed by the hardware processor, causes the hardware processor to map output values in a final run of a training phase; and measure dense data portion and sparse data portion of a data plot produced by the training phase by identifying outputs near edges of the data plot and extracting the curve patterns as linear functions in the dense areas of the output. The computer program product can also obtain a fractal function base set of patterns from the linear functions provided by the dense areas of the output; and apply the fractal function base set of patterns from the dense areas of the output to the sparse data portion of the data plot. The computer program product can also train the artificial intelligence model using the data plot including the dense areas of the output and the sparse data portion of the data plot that has been fit to the data curve using the fractal function base set of patterns.

In yet another aspect of the present disclosure, a computer program product for training the classifier of an artificial intelligence model is described that includes a computer readable storage medium having computer readable program code embodied therewith, the program instructions executable by a processor to cause the processor to map, using the processor, output values in a final run of a training phase; and measuring, using the processor, dense data portion and sparse data portion of a data plot produced by the training phase by identifying outputs near edges of the data plot and extracting the curve patterns as linear functions in the dense areas of the output. The computer program product can also obtain, using the processor a fractal function base set of patterns from the linear functions provided by the dense areas of the output; and apply, using the processor, the fractal function base set of patterns from the dense areas of the output to the sparse data portion of the data plot. The computer program product can also train, using the processor, the artificial intelligence model using the data plot including the dense areas of the output and the sparse data portion of the data plot that has been fit to the data curve using the fractal function base set of patterns.

BRIEF DESCRIPTION OF THE DRAWINGS

The following description will provide details of preferred embodiments with reference to the following figures wherein.

DETAILED DESCRIPTION

Figure 1:
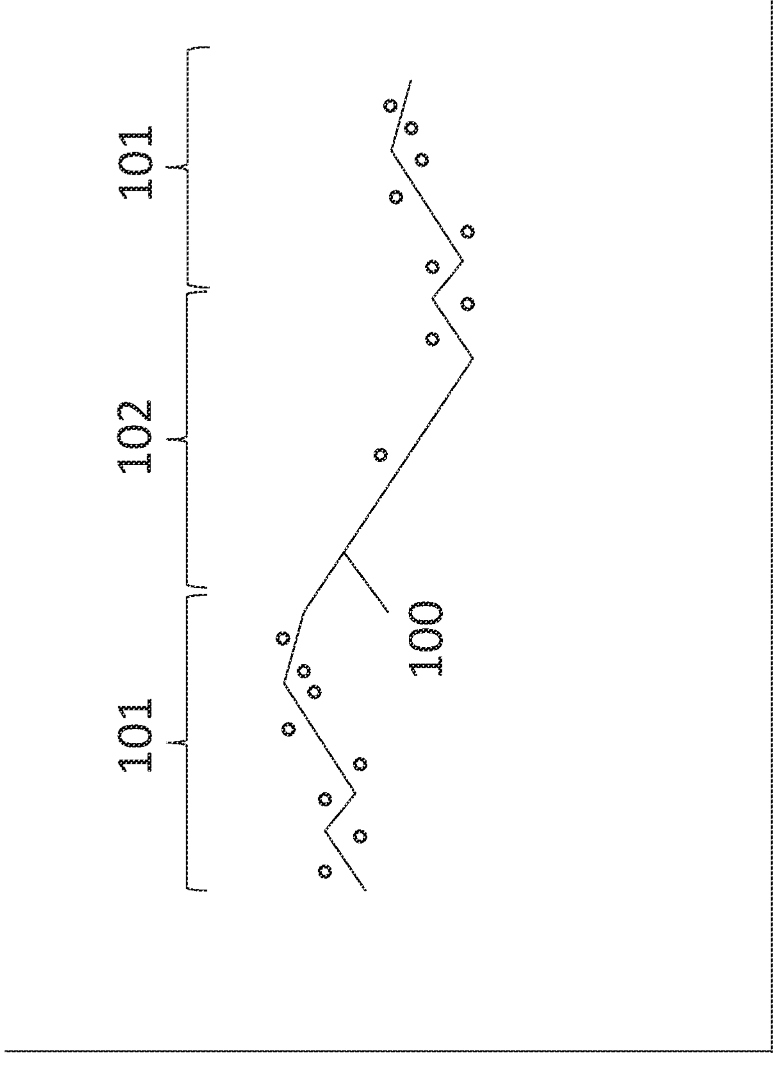
FIG. 1 is a plot indicating a proper line fitting for a high-density data cluster and a sparse data cluster in which line fitting must be extrapolated, in which the data plotted is for training an artificial intelligence model.

The methods, systems, and computer program products described herein relate to detecting fractal relationships in cluster edge structures in artificial intelligence (AI) models. Current solutions include hyperplanes, probabilistic assumption and root mean square (RMS) determination. Other solutions can be achieved through a simulation including the generation of a large set of input values so that most if not all the output points can be covered in the solution space. These are not efficient as they involve a high cost, an uncertainty of the results and reduced confidence on the machine learning (ML) model. It has been determined that error rates for current machine learning (ML) model clustering outputs can be as high as 20% or more.

Convex and concave optimization curve fitting between output points (hyper-hulls) are another output optimization model that is available today. In most scenarios, a straight line separation of the binary cluster edge is seen, which is associated with probability/noise bands to allow for a point to be determined to belong to the other cluster to fit in. Current solutions include hyper planes or a join of different perpendicular bisectors between the near-by output points to determine the cluster/class boundaries. The drawbacks of these solutions are naturally that only definite cluster output values that map to a value in the train/test data set can provide a confirmed output and the false conditions cannot be easily determined without confirmation with other data.

In one example, in which the test outputs is for data on diseases, a machine learning (ML) model for analyzing diseases can provide a false positive or a false negative, which can have high impact consequences on the analysis. When the output points are spread over a larger space, using the perpendicular bisector provides a linear edge, which may not depict the actual value. When more testing and re-training data is used after a false positive or false negative is detected, the hyperplanes are redrawn to accommodate the errors. Even in the case of convex hulls, there is a good probability of the output being wrongly classified, e.g., between 5-10% error rates based on the application area and the training data set). There is another trade-off that is applied using hyper parameters to stop training early when loss is above a local minima to avoid overfitting of data that the edges are tight with the learning data set and as new data points are obtained, the overfitting reduces the AI model accuracy.

Hence, in view of the aforementioned disadvantages, a method is provided for detecting fractal relationships in cluster edge structures in artificial intelligence (AI) models. A "fractal" is a mathematical set that can exhibit a repeating pattern, which is displayed at every scale. Fractal models can be used to design new machine learning algorithms. If, for instance, there is a particular family of fractal probability distributions, the distributions can be analyzed to determine which is best to describe a given dataset.

FIG. 1 illustrates data fitting used for trailing an artificial intelligence model. The plot 100 includes high density data populations 101 having a plurality of points in clusters that can provide defined cluster edges. The portions of the plot that can result in inaccuracies and improper training of the artificial intelligence model include the portions of the plot 100 that have sparse data populations 102. The methods, systems and computer program products that are described herein can improve the classification accuracy, while at the same time not increasing the training data volume needs or overfitting the model.

The nature of the edge of a cluster are specific to the program space and from a given test/train data set. Clustering is a machine learning technique that involves the grouping of data points. Given a set of data points, we can use a clustering algorithm to classify each data point into a specific group. In theory, data points that are in the same group should have similar properties and/or features, while data points in different groups should have highly dissimilar properties and/or features.

In machine learning systems, examples can be grouped as the first step towards understanding the dataset. Grouping an unlabeled example is called clustering. As the samples are unlabelled, clustering relies on unsupervised machine learning. If the examples are labeled, then it becomes classification.

In some embodiments, one can determine certain output edges in dense output spaces that can be determined to be representative where these output points are almost continuous. This is depicted in section 101 of the plot 100 depicted in FIG. 1. In accordance with graph theory, a graph is a mathematical structure consisting of a set of points called vertices and a set (possibly empty) of lines linking some pair of vertices. It is possible for the edges to oriented, i.e., to be directed edges. The lines are called edges if they are undirected, and or arcs if they are directed. The term arc and curves can be used interchangeably throughout the present disclosure. The methods, systems and computer program products can detect the curve structure in such areas as determined the mapping of this across the entire cluster boundary to test the pattern match at multiple abstraction/aggregation lengths.

In some embodiments, the methods, systems and computer program products that are described herein can determine for all points at the boundary at very high discrimination/very small differences of the output values, where the edge is. Thus, the methods can provide a different computation to support the result of whether the cluster output predicted is in the right cluster, or whether the cluster output predicted is obtained in a space where that has been not previously trained output point. In examples of current trends, where non-linearity of the edge exists, current methods use noise function definitions to extend just the edge at those points.

The methods, systems and computer program products of the present disclosure employ an approach that uses fractal edges across the entire space, and define either through a Markov chain approach or quasi probability conditions to determine the scale of the fractal edge definition, since one can go to infinitesimal or differential spaces that tend to zero while holding the edge definition. This is particularly suitable for extrapolating the data in the sparse data sections 103 of the plot 101.

A Markov chain or Markov process is a stochastic model describing a sequence of possible events in which the probability of each event depends only on the state attained in the previous event.

In some embodiments, using the high resolution approach would lead to very high computation to determine the curves around the output point if the appropriate area and scaling is not determined. A fine discrimination increases the computation, which may not be necessary because the larger scale of the fractal like edge will provide the same answer, and one can determine from the probability above a threshold if further scale reduction is needed.

The methods, systems and computer program products described herein can determine the scale level through the steps in the area expansion from the unit value in relation to the neighborhood points and within the area, use the cluster edge geometry function (which provides geometric definitions between points of asymmetry) to draw the boundary, and determine if the proposed output value lies in which cluster. Where the fine details were determined from areas where multiple n clusters were available and the current output value indicates a (n-m) cluster area, the grouping is considered at the scaled level.

If the classification matches to the one provided by the model and the hyperplane, it can be determined that there is alignment. However, if the class/cluster provided is different (based on the distance to the hyperplane and the accuracy of the model) appropriate decision can be made to refer to a human factor, or if the distance shown is mapped to the classifier accuracy and it can be shown that there is sufficient separation between the fractal boundary and the hyperplane, then the calculated value can be taken as a true representation for classification.

One distinction for the methods, systems and computer program products for detected fractal relationships in clustered proposed idea are that the edge non-linearity is introduced more as a localized noise in existing art to cater to the spatial requirements, which needs frequent adjustments as newer results of false classifications arise. The use of fractal like geometry specification for the boundaries as a function set of finite lengths at different step sizes provides a better response than the hyperplane with a better explanation of symmetries and asymmetric endings. The fractal like geometry specification is employed for fitting the sparse data population 103 portion of the plot 100 depicted in FIG. 1. The benefits from this approach are an increase in explanation for the position of an input into an output cluster, use of natural occurring patterns in the classification to sparse areas in the output class map, reduction in false classification due to hyperplane linear class separation in specific classes and a reduction in frequency of the model re-calibration.

As will be further described below, the methods, systems and computer program products can determine linear/non-linear curve boundary at the segments with high frequency of the output points as the base model. The methods, systems and computer program products can provide an improvement for the output cluster prediction. In some embodiments, the methods, systems and computer program products can provide fractal function determination and step size driven sizing of a given edge feature that is obtained for the area with the best representative edge. Both at the high frequency and a non-matching pattern area, the aggregation/abstraction model enables irregular edge curves to be considered in the solution space.

The methods, systems and computer program products are now described in greater detail with reference to FIGS. 1-7.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
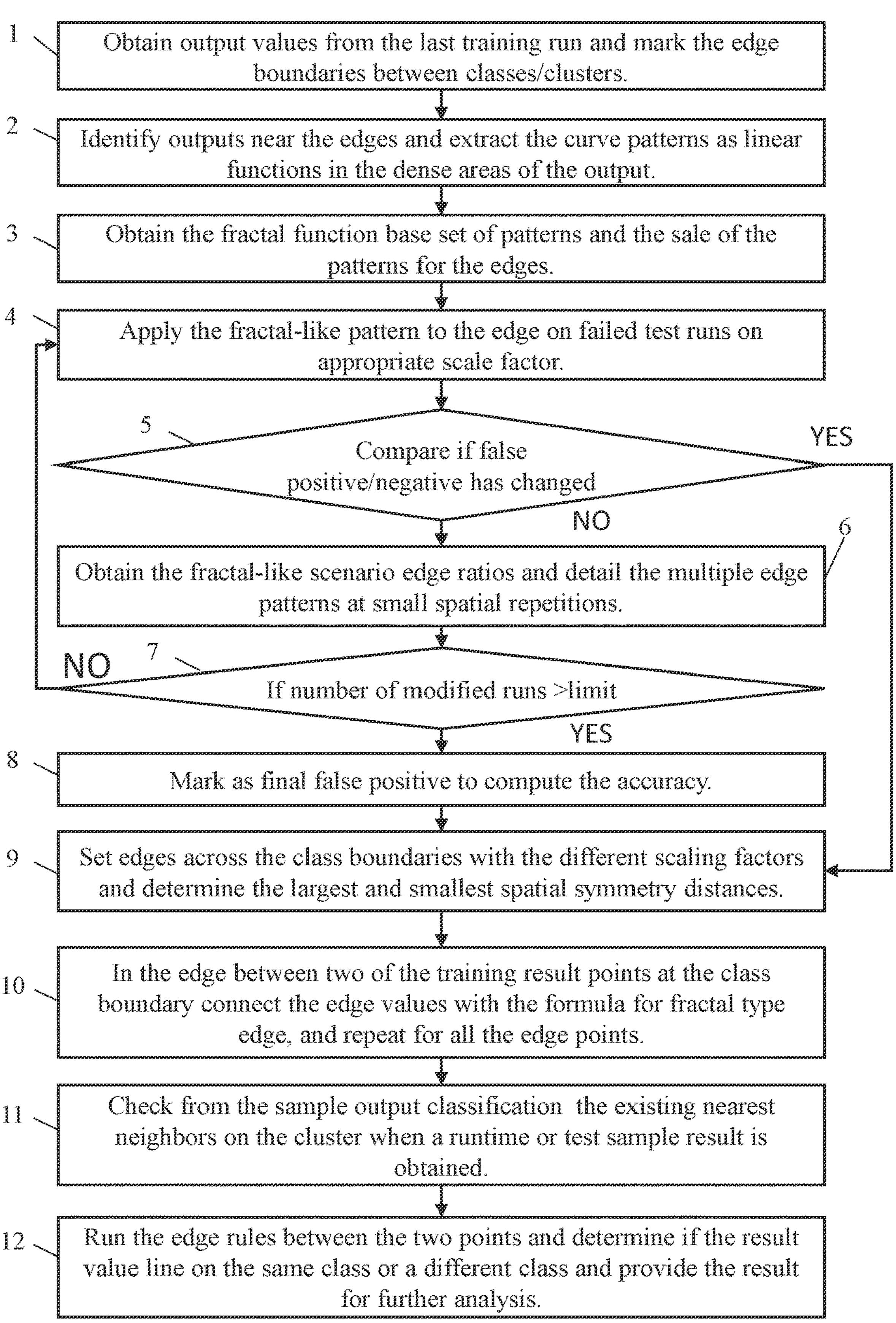
FIG. 2 is a flow/block diagram showing one embodiment a method for detecting fractal relationships in cluster edge structures for artificial intelligence models, in accordance with some embodiments of the present disclosure.
Figure 3:
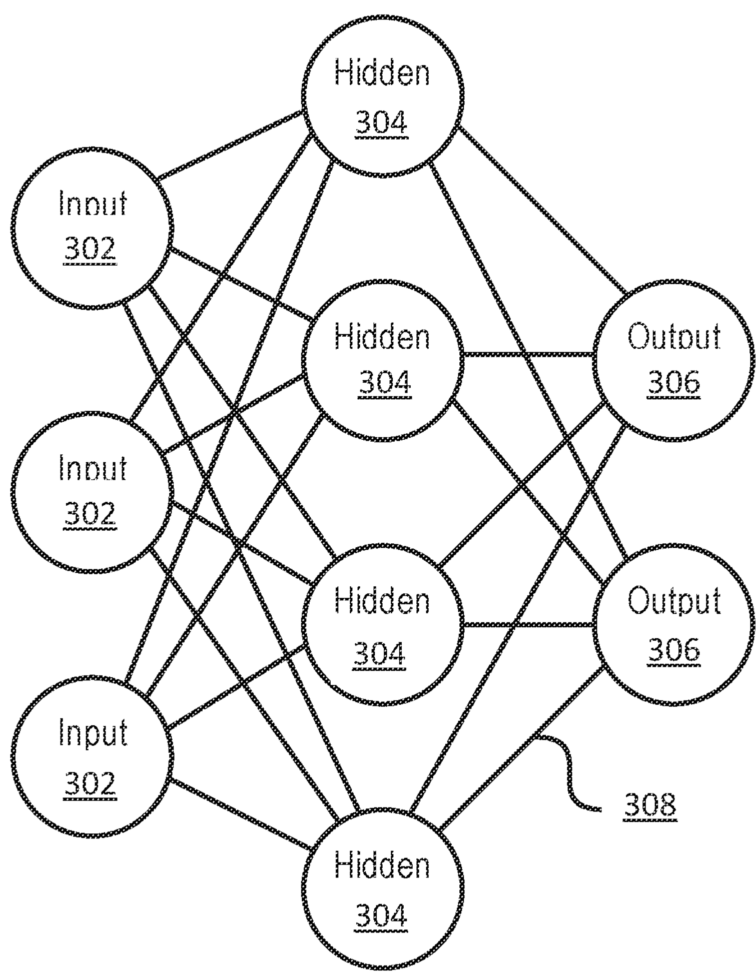
FIG. 3 is an illustration of an example environment illustrating a neural network for an artificial intelligence model, in accordance with some embodiments of the present disclosure.

FIG. 2 is a flow/block diagram showing one embodiment a method for detecting fractal relationships in cluster edge structures for artificial intelligence models. FIG. 3 is an illustration of a block diagram depicting one embodiment of a system for detecting fractal relationships that in some examples can be used with the method depicted in FIG. 2.

Referring to block 1 of the method depicted in FIG. 2, in some embodiments, the method may begin with the artificial intelligence (AI) system mapping the output values in a final run of a training phase. In some embodiments, block 1 can include obtaining output values from the last training run and marking the edge boundaries between the classes and the clusters. As illustrated in FIG. 1, the output values may include a high-density portion 101 and a sparse density portion 102 on the plot of data 100.

Artificial Machine learning systems can be used to predict outcomes based on input data. For example, given a set of input data, a machine learning system can predict an outcome. The machine learning system will likely have been trained on much training data in order to generate its model. It will then predict the outcome based on the model.

In some embodiments, the artificial machine learning system includes an artificial neural network (ANN). FIG. 3 is an illustration of an example environment illustrating a neural network for an artificial intelligence model. One element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons. An ANN is configured for a specific application, such as pattern recognition or data classification, through such a learning process.

Referring now to FIG. 3, a generalized diagram of a neural network is shown. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known generally to have input neurons 302 that provide information to one or more "hidden" neurons 304. Connections 308 between the input neurons 302 and hidden neurons 304 are weighted, and these weighted inputs are then processed by the hidden neurons 304 according to some function in the hidden neurons 304. There can be any number of layers of hidden neurons 304, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 306 accepts and processes weighted input from the last set of hidden neurons 304.

This represents a "feed-forward" computation, where information propagates from input neurons 302 to the output neurons 306. Upon completion of a feed-forward computation, the output is compared to a desired output available from training data. The error relative to the training data is then processed in "backpropagation" computation, where the hidden neurons 304 and input neurons 302 receive information regarding the error propagating backward from the output neurons 306. Once the backward error propagation has been completed, weight updates are performed, with the weighted connections 308 being updated to account for the received error. It should be noted that the three modes of operation, feed forward, back propagation, and weight update, do not overlap with one another. This represents just one variety of ANN computation, and that any appropriate form of computation may be used instead. In the present case the output neurons 306 provide analysis of whether a package has been handled correctly according to the data provided from the input of the IoT sensors.

To train an ANN, training data can be divided into a training set and a testing set. The training data includes pairs of an input and a known output. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process continues until the pairs in the training set are exhausted. In some embodiments, the streaming plan generator 303 trains to match search items extracted from definitions for requirements used in the requirement management tool to source code that is stored in repositories.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight 308 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs. Alternatively, the weights 308 may be implemented as resistive processing units (RPUs), generating a predictable current output when an input voltage is applied in accordance with a settable resistance.

FIG. 3 illustrates how a training model can be employed in an artificial intelligence application. In some embodiments, the training model may be employed for providing an artificial intelligence model for machine vision. In the machine vision application, the fractals may be employed to supplement the data for training the model to identify objects from a digital image.

Referring back to FIG. 2, at block 2 the method can continue with the output map being analyzed to determine the dense areas and the separation support vector points in it. This can also be used by the hyperplane across all points, i.e., not only in the dense areas. In some embodiments, block 2 may include identifying outputs near the edges, and extract the curve patterns as linear functions in the dense areas of the output. In some embodiments, curves are obtained for more than only the hyperplane. In some embodiments, the approach may start with the perpendicular bisector approach. In one embodiment that employs the perpendicular bisector approach, where the points of one cluster lie across a straight line boundary, if any, the geometric curves of finite length are determined. In some embodiments, the fractal analysis engine determines from the finite length formula in the dense space, the set of functions defining the edge.

Referring to block 3 of FIG. 1, in some embodiments, the method may further include obtaining a fractal function base set of patterns, and the scale of the patterns for the edges.

In some embodiments, the probability of the other edge or support vector points in spaces is obtained from a normally distributed input set. In some examples, the method can check the input to output distribution to see that the Gaussian/normal distribution is maintained, and the method can readjust the input sequence if necessary. In some embodiments, to set up Markov parameters, the spatial probabilities are computed over an initial unit area and expanded till it meets the boundary of the neighboring area. The steps of expansion being measured for each such area.

Referring to block 4 of FIG. 2, in a following step, the method may include applying the fractal like pattern to the edge of failed test runs. In some embodiments, for the test data set, the method can determine the area in which the output point lies, and the expansion step to determine the length and scaling of the curves/lines in the fractal edge/surface definition function set. The expansion step may be used to determine if the output clusters/classes is the same or different from the initial clusters/classes output of the AI model. In one embodiment, if the clusters/classes are different, the method can highlight the distance of boundary between the output point and the hyperplane and the output point and function from this idea. In another embodiment, the clusters/classes are different, and the method can highlight the distance of boundary shift between the hyperplane and the function.

Referring to block 5 of FIG. 1, in a following step, the method may compare if a false positive occurs. If a false positive has occurred at block 5, the method may advance to block 9. If a false positive did not occur at block 5, the method may advance to block 6.

Block 6 of FIG. 1 includes obtain the fractal-like scenario edge ratios and detail the multiple edge patterns at small spatial repetitions.

At block 7 of FIG. 1, the method may include determining if the number of modified runs is greater than a predefined limit. If at block 7, the predetermined number of runs has been executed, the method may continue to block 8. If at block 7, the predetermined number of runs has not been executed, the method can step back to block 4.

Referring to block 8, false positives may be marked as final, and the accuracy can be computed.

Block 9 can include setting the edges across the class boundaries with different scaling factors and determine the largest and smallest spatial symmetry distances.

Referring to FIG. 2, in some embodiments, at block 10, in the edge between two of the training result points at the class boundary the method can connect the edge values with the formula for fractal type edge, and repeat for all the edge points.

Turning to block 11, the method can check from the sample output classification the existing nearest neighbors on the cluster when a runtime or test sample result is obtained.

At block 12, the method can run the edge rules between the two points and determine if the result value line on the same class or a different class and provide the result for further analysis.

Following block 12, the data set may be employed for training the artificial intelligence model using the data plot including the dense areas of the output and the sparse data portion of the data plot that has been fit to the data curve using the fractal function base set of patterns.

In some embodiments, the methods described herein can provide a determination of linear/non-linear curve boundaries at the segment with high frequency of the output points at the base model. In some embodiments, the methods described herein can provide an improvement of the output cluster prediction with objective explanation. In some other embodiments, the methods described herein can provide a fractal function determination with step size driven sizing of a given edge feature that is obtained for the area of the best representative edge. Both at high frequency and non-matching pattern area, the aggregation/abstraction model enables irregular edge curves to be considered in the solution space.

FIG. 3 is an illustration depicting one embodiment of a system 200 for training the classifier of an artificial intelligence model is described that includes a hardware processor 211; and a memory 212 that stores a computer program product. The computer program product when executed by the hardware processor 211, causes the hardware processor 211 to map output values in a final run of a training phase. In some embodiments, the output values may be mapped in the final run of the training phase by a data point mapper 201. The system 201 can also measure dense data portion and sparse data portion of a data plot produced by the training phase by identifying outputs near edges of the data plot and extracting the curve patterns as linear functions in the dense areas of the output. The step of analyzing the data plot to identify the dense data portion and the sparse data portion, and the step of extracting the curve patterns can be provided by a data plot analyzer 202.

The computer program product can also obtain a fractal function base set of patterns from the linear functions provided by the dense areas of the output; and apply the fractal function base set of patterns from the dense areas of the output to the sparse data portion of the data plot. The The step of obtaining a fractal function base set of patterns from the linear functions provided by the dense areas of the output; and apply the fractal function base set of patterns from the dense areas of the output to the sparse data portion of the data plot can be provided by a fractal analysis engine 203. The computer program product can also train the artificial intelligence model using the data plot including the dense areas of the output and the sparse data portion of the data plot that has been fit to the data curve using the fractal function base set of patterns. The training of the artificial intelligence module can be performed by an artificial intelligence model training module 204.

Figure 5:
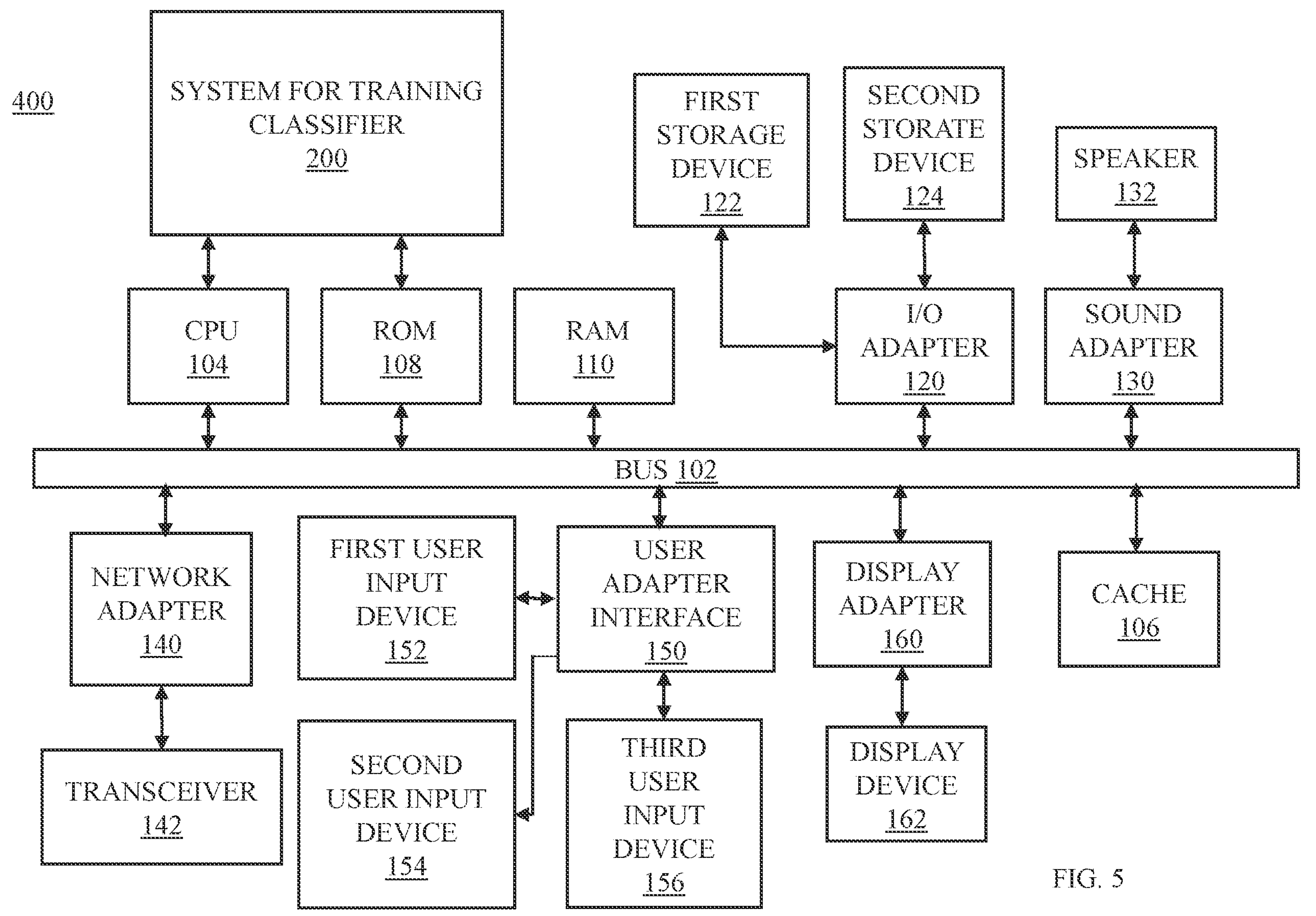
FIG. 5 is a block diagram illustrating a system that can incorporate the system for detecting fractal relationships in cluster edge structures for artificial intelligence models that is depicted in FIG. 4, in accordance with one embodiment of the present disclosure.

FIG. 5 illustrates a processing system 400 used by or comprised by the system 200 of FIG. 3 for training the classifier of an artificial intelligence model, in accordance with the methods and systems described above in FIGS. 1-3. The bus 102 interconnects the plurality of components for the system 200 described above with the components depicted in the computer system 400 depicted in FIG. 5.

The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The processing system 400 depicted in FIG. 5, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400, which can include the system 100 for reducing cross contamination.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

Figure 4:
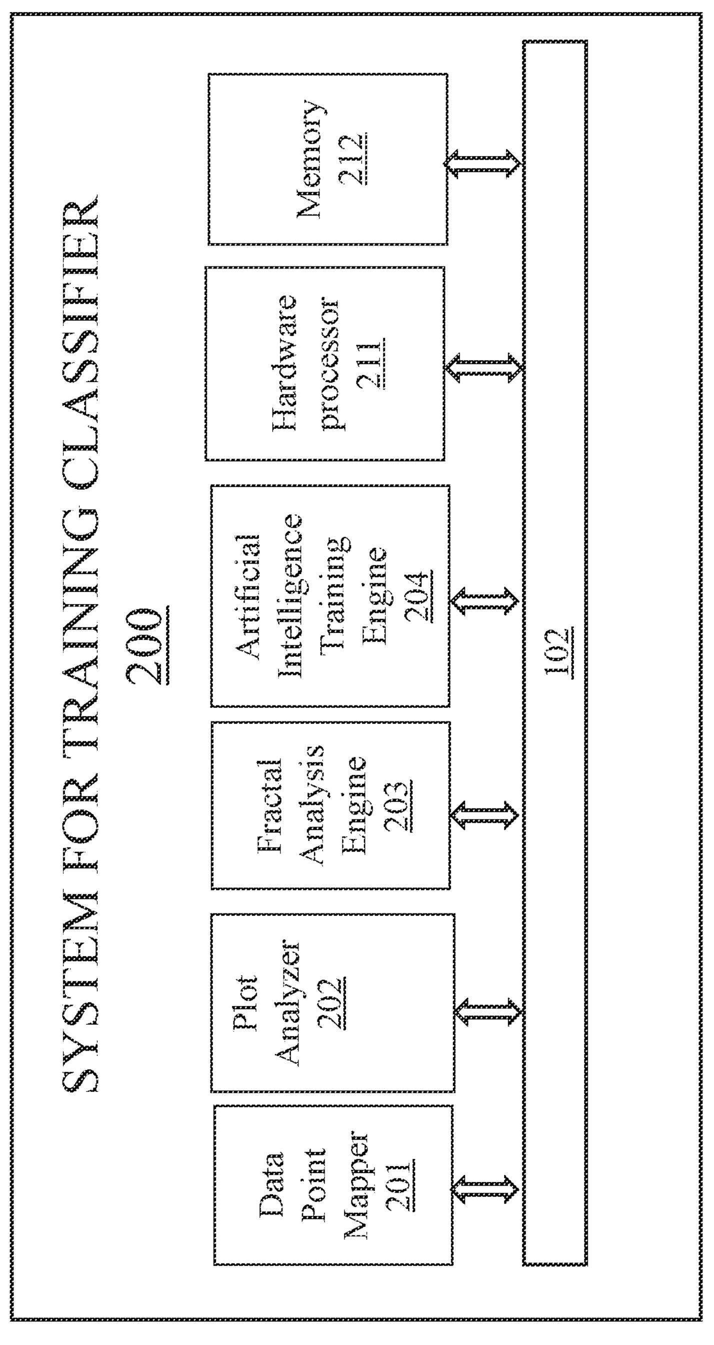
FIG. 4 is a block diagram depicting one embodiment of a system for detecting fractal relationships in cluster edge structures for artificial intelligence models, in accordance with so/me embodiments of the present disclosure.

While FIG. 5 shows the computer system 400 as a particular configuration of hardware and software, any configuration of hardware and software, as would be known to a person of ordinary skill in the art, may be utilized for the purposes stated supra in conjunction with the particular computer system 100 of FIG. 4. For example, the memory devices 94 and 95 may be portions of a single memory device rather than separate memory devices.

The present invention may be a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

In one embodiment, the present disclosure provides a non-transitory computer readable storage medium that includes a computer readable program for training the classifier of an artificial intelligence model. The computer readable storage medium has computer readable program code embodied thereon. The program instructions is executable by a processor to cause the processor to map output values in a final run of a training phase; and measure dense data portion and sparse data portion of a data plot produced by the training phase by identifying outputs near edges of the data plot and extracting the curve patterns as linear functions in the dense areas of the output. The computer program product can also obtain, using the processor a fractal function base set of patterns from the linear functions provided by the dense areas of the output; and apply, using the processor, the fractal function base set of patterns from the dense areas of the output to the sparse data portion of the data plot. The computer program product can also train, using the processor, the artificial intelligence model using the data plot including the dense areas of the output and the sparse data portion of the data plot that has been fit to the data curve using the fractal function base set of patterns.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment (e.g., Internet of thing (IOT)) now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 6:
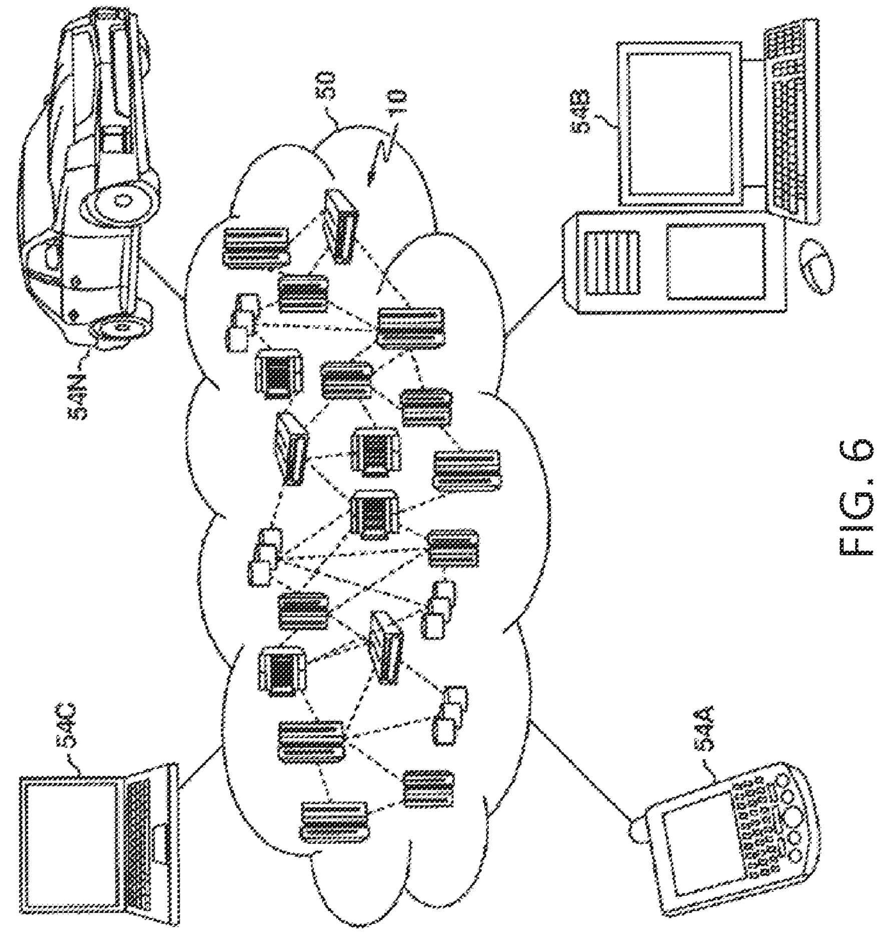
FIG. 6 depicts a cloud computing environment according to an embodiment of the present disclosure.

Referring now to FIG. 6, illustrative cloud computing environment is depicted. As shown, cloud computing environment includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 7:
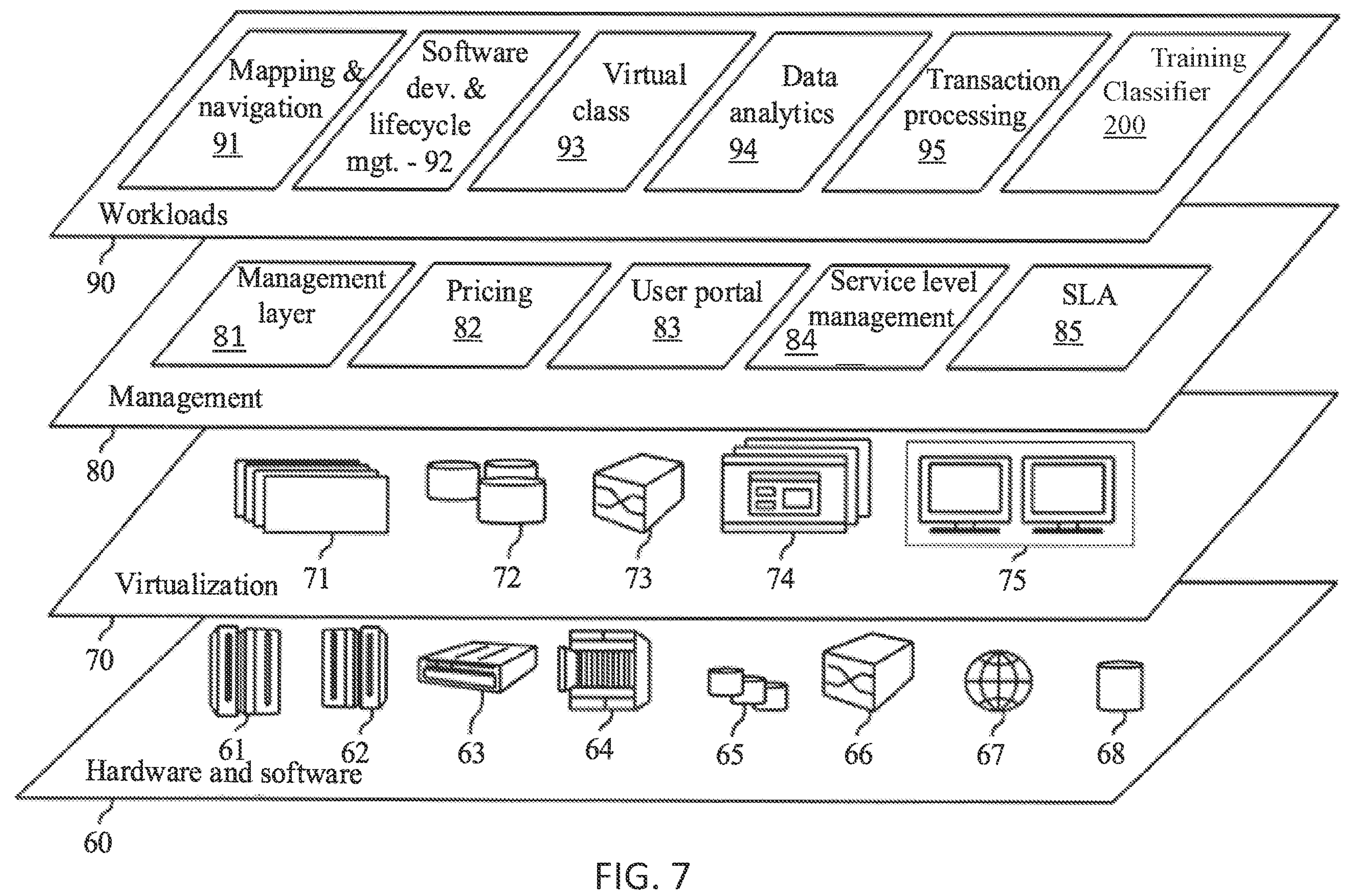
FIG. 7 depicts abstraction model layers according to an embodiment of the present disclosure.

Referring now to FIG. 7, a set of functional abstraction layers provided by cloud computing environment (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for a system for training a classifier of artificial intelligence models 200 in accordance with FIGS. 1-6.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A computer-implemented method for training a classifier of an artificial intelligence (Al) model, the computer-implemented method comprising:

mapping output values in an n-th run of a training phase for the Al model having n number of runs of the training phase;

measuring a dense data portion and a sparse data portion of a data plot produced by the training phase, wherein the dense data portion comprises a first plurality of data points, the sparse data portion comprises a second plurality of data points, and the first plurality of data points is greater than the second plurality of data points;

identifying one or more output values of the output values near edges of the data plot, wherein the identifying of the one or more output values comprises extracting curve patterns as linear functions in the dense data portion of the output values;

obtaining a fractal function base set of patterns from the edges of the data plot in the dense data portion of the output values based on the identifying of the one or more output values;

applying the fractal function base set of patterns from the dense data portion of the output values to the sparse data portion of the data plot, wherein the applying of the fractal function base set of patterns comprises fitting, to the sparse data portion of the data plot, the curve patterns associated with the dense data portion of the output values; and training the AI model based on the applying of the fractal function base set of patterns, wherein the training of the AI model comprises predicting one or more classification outputs for the sparse data portion, and the training of the AI model based on the applying of the fractal function base set of patterns retains training data volume while increasing classification accuracy of the AI model and reducing false classification of data.

2. The computer-implemented method of claim 1, wherein the obtaining of the fractal function base set of patterns from the edges of the data plot includes analysis of the curve patterns from the linear functions provided by the dense data portion of the output values.

3. The computer-implemented method of claim 1, further comprising scaling the fractal function base set of patterns to fit the data plot.

4. The computer-implemented method of claim 1, wherein the AI model is employed in machine learning to identify objects from digital images.

5. The computer-implemented method of claim 1, wherein the dense data portion of the data plot comprises a first spatial distance between a first set of data points in a first cluster of data points and a second spatial distance between a second set of data points in a second cluster of data points, and wherein the first plurality of data points includes the first set of data points and the second set of data points, and the first spatial distance is smaller than the second spatial distance.

6. The computer-implemented method of claim 1, wherein the AI model is trained based on a detection of a false positive or a false negative.

7. A system for training a classifier of an artificial intelligence (AI) model, the system comprising:

a hardware processor; and a memory that stores a computer program product, the computer program product when executed by the hardware processor, causes the hardware processor to:

map output values in an n-th run of a training phase for the AI model having n number of runs of the training phase;

measure a dense data portion and a sparse data portion of a data plot produced by the training phase, wherein the dense data portion comprises a first plurality of data points, the sparse data portion comprises a second plurality of data points, and the first plurality of data points is greater than the second plurality of data points;

identify one or more output values of the output values near edges of the data plot, wherein the identification of the one or more output values comprises extraction of curve patterns as linear functions in the dense data portion of the output values;

obtain a fractal function base set of patterns from the edges of the data plot in the dense data portion of the output values based on the identification of the one or more output values;

apply the fractal function base set of patterns from the dense data portion of the output values to the sparse data portion of the data plot, wherein the application of the fractal function base set of patterns comprises fitting, to the sparse data portion of the data plot, the curve patterns associated with the dense data portion of the output values; and train the AI model based on the application of using the fractal function base set of patterns, wherein the training of the AI model comprises prediction of one or more classification outputs for the sparse data portion, and the training of the AI model based on the application of the fractal function base set of patterns retains training data volume while increasing classification accuracy of the AI model and reduces false classification of data.

8. The system of claim 7, wherein the obtaining of the fractal function base set of patterns from the edges of the data plot includes analysis of the curve patterns from the linear functions provided by the dense data portion of the output values.

9. The system of claim 7, wherein the computer program product when executed by the hardware processor, further causes the hardware processor to scale the fractal function base set of patterns to fit the data plot.

10. The system of claim 7, wherein the AI model is employed in machine learning to identify objects from digital images.

11. The system of claim 7, wherein the dense data portion of the data plot comprises a first spatial distance between a first set of data points in a first cluster of data points and a second spatial distance between a second set of data points in a second cluster of data points, and wherein the first plurality of data points includes the first set of data points and the second set of data points, and the first spatial distance is smaller than the second spatial distance.

12. The system of claim 7, wherein the AI model is trained based on a detection of a false positive or a false negative.

13. A computer program product for training a classifier of an artificial intelligence (AI) model comprising a computer readable storage medium having computer readable program code embodied therewith, the computer readable program code executable by a processor to cause the processor to:

map, using the processor, output values in an n-th run of a training phase for the AI model having n number of runs of the training phase;

measure, using the processor, dense data portion and sparse data portion of a data plot produced by the training phase, wherein the dense data portion comprises a first plurality of data points, the sparse data portion comprises a second plurality of data points, and the first plurality of data points is greater than the second plurality of data points;

identify, using the processor, one or more output values of the output values near edges of the data plot, wherein the identification of the one or more output values comprises extraction of curve patterns as linear functions in the dense data portion of the output values;

obtain, using the processor, a fractal function base set of patterns from the edges of the data plot in the dense data portion of the output values based on the identification of the one or more output values;

apply, using the processor, the fractal function base set of patterns from the dense data portion of the output values to the sparse data portion of the data plot, wherein the application of the fractal function base set of patterns comprises fitting, to the sparse data portion of the data plot, the curve patterns associated with the dense data portion of the output values; and train, using the processor, the AI model based on the application of the fractal function base set of patterns, wherein the training of the AI model comprises prediction of one or more classification outputs for the sparse data portion, and the training of the AI model based on the application of the fractal function base set of patterns retains training data volume while increasing classification accuracy of the AI model and reduces false classification of data.

14. The computer program product of claim 13, wherein the obtaining of the fractal function base set of patterns from the edges of the data plot includes analysis of the curve patterns from the linear functions provided by the dense data portion of the output values.

15. The computer program product of claim 13, the computer readable program code executable by the processor to further cause the processor to scale the fractal function base set of patterns to fit the data plot.

16. The computer program product of claim 13, wherein the AI model is employed in machine learning to identify objects from digital images.

17. The computer program product of claim 13, wherein the AI model is trained based on a detection of a false positive or a false negative.

* * * * *